Nov. 12, 1946.   J. O. DE CHAPPEDELAINE   2,410,963
HELICOPTER ROTOR MOUNTING
Filed June 15, 1944   3 Sheets-Sheet 1

Inventor
JEAN O. DE CHAPPEDELAINE

By Emery Holcombe & Stein
Attorneys

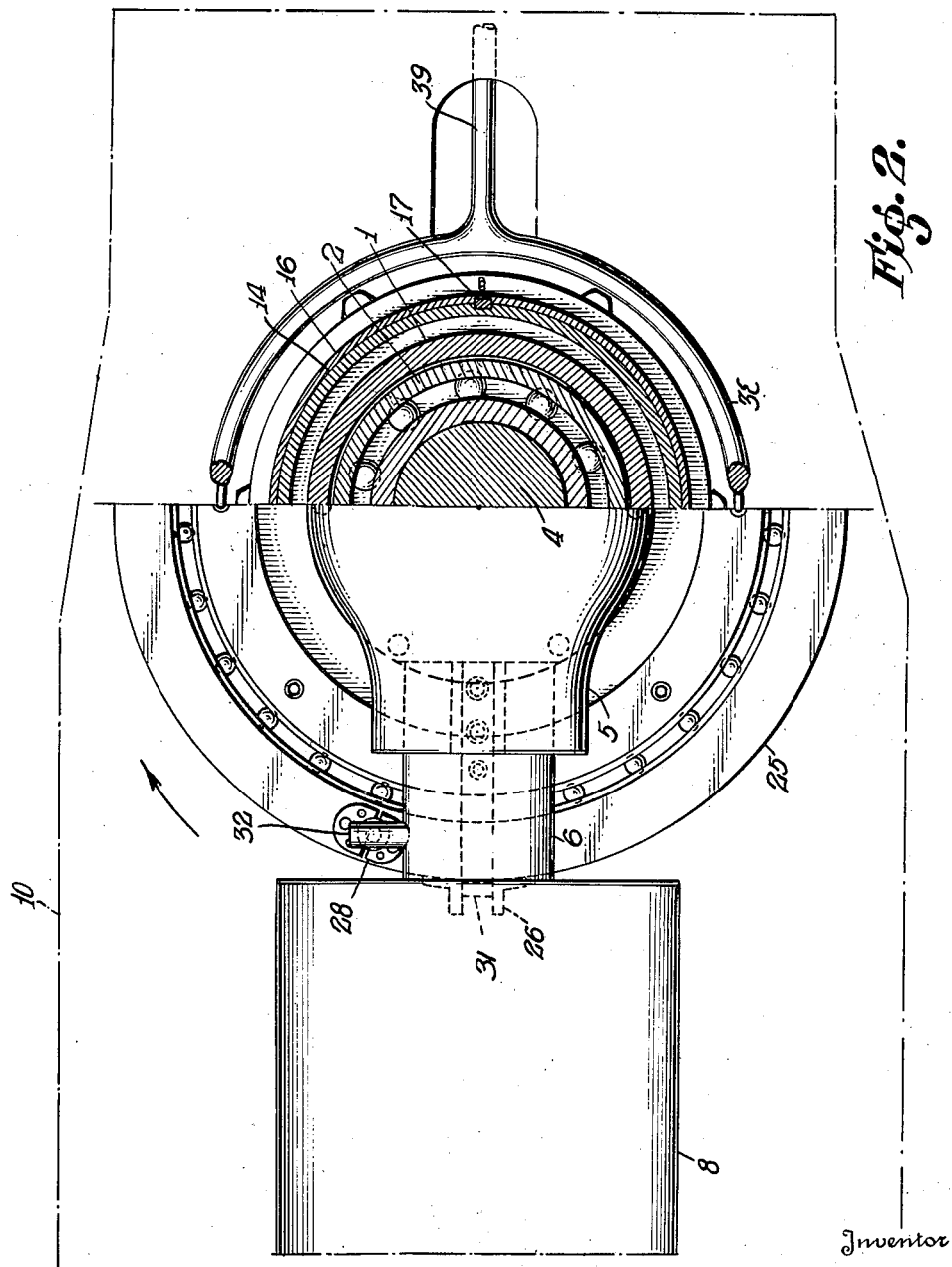

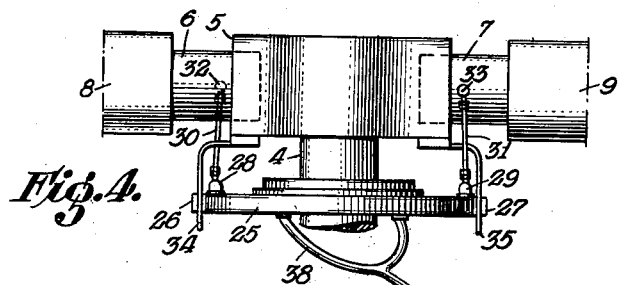
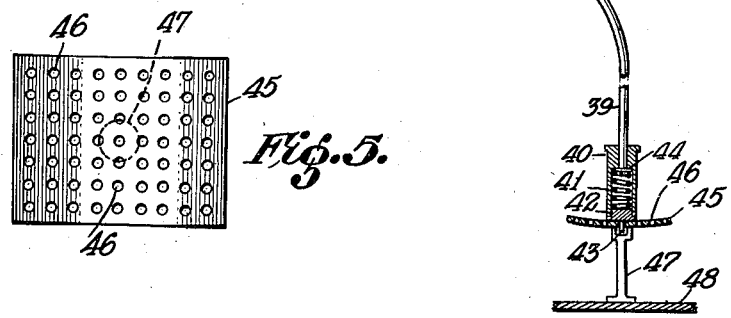
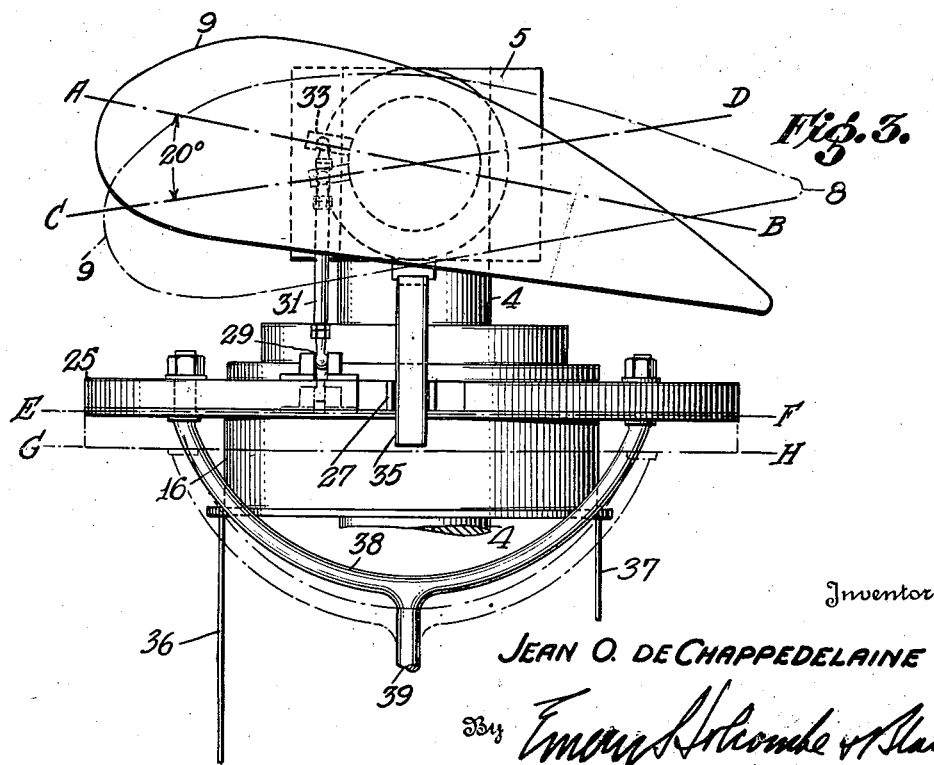

Patented Nov. 12, 1946

2,410,963

UNITED STATES PATENT OFFICE 2,410,963

HELICOPTER ROTOR MOUNTING

Jean Olivier de Chappedelaine, Reading, Pa.

Application June 15, 1944, Serial No. 540,426

6 Claims. (Cl. 244—17)

This invention relates to helicopters and more particularly to a mounting for the main lifting rotor together with means for controlling the pitch of the rotor blades. The present invention more especially is directed to a flexible mounting which also secures automatically stabilization of the rotor and will permit the pitch of the entire rotor to be changed at will and be locked in any desired adjusted position.

In order that a clearer understanding of the invention and the object shown to be accomplished may be attained, it may be stated that the invention is particularly useful in the case of what is known as rigid helicopter rotors; that is, rotors whose blades are not hinged and do not possess the frequently seen flapping freedom. With the mounting claimed, a sufficient freedom of the whole rotor with regard to the fuselage is secured so that it will accomplish certain objects not heretofore obtained with the loosely mounted rotors. Accordingly, it is one of the objects of the present invention to provide a rotor for a helicopter which is substantially rigid in construction yet provides for the desired freedom of connection between the rotor and the fuselage.

A further object is to provide a mechanism of the above character which will absorb the vibrations which may be developed by the rotor when in operation.

A further object is to provide for pitch control and the locking of the rotor in any desired position with respect to the fuselage.

A further object is to provide for unexpected tilting motion between the rotor and the fuselage which will be damped out by the peculiar mounting of the rotor and will be automatically counteracted by a suitable change of pitch.

A further object is to provide a mechanism not only adapted to control the pitch of the rotor but to permit the control to be locked in desired position or quickly changed to a different position thereby allowing the operator to have free use of his hands during normal flight.

A further object is to provide a mechanism which, in case of engine failure, enables the rotor blades to be set in a negative pitch so that the rotor which is automatically disconnected from the engine as for example by a free wheeling mechanism, not shown in this application, can keep rotating by itself in the same direction. Such simple device enables the pilot to change the rotor pitch to a suitable negative position and this may take place automatically as fully explained in my copending application.

A further object is to provide a mechanism of the above character having relatively few parts which may be inexpensively manufactured and assembled and which when so assembled will be reliable and safe in use and operation.

Other objects will be in part obvious from the annexed drawings and in part hereinafter pointed out in connection with the following analysis of this invention.

This invention accordingly consists in the features of construction, combination of parts, and in the unique relation of the various members and in the relative proportioning and disposition thereof, all as more completely outlined herein.

To enable others skilled in the art fully to comprehend the underlying features of this invention and the numerous modifications in structure and relation contemplated thereby, drawings depicting one of various possible modifications of the invention have been annexed as part of this disclosure, and in such drawings like characters of reference denote corresponding parts throughout all of the views, in which—

Fig. 2 is a half-plan view and a half sectional view of the device shown in Fig. 1, the section being taken substantially on the line 2—2 of Fig. 1.

Fig. 3 is a side elevational view showing the blade section in positive pitch; the swiveling disk with the connecting rods attached and the control stick yoke; and in dotted lines the blade section in a negative pitch position.

Fig. 4 is a view showing the control stick handle with a locking device and a section of a perforated locking blade attached to the fuselage.

Fig. 5 is a plan view of the perforated locking plate shown in Fig. 4.

Figure 1:
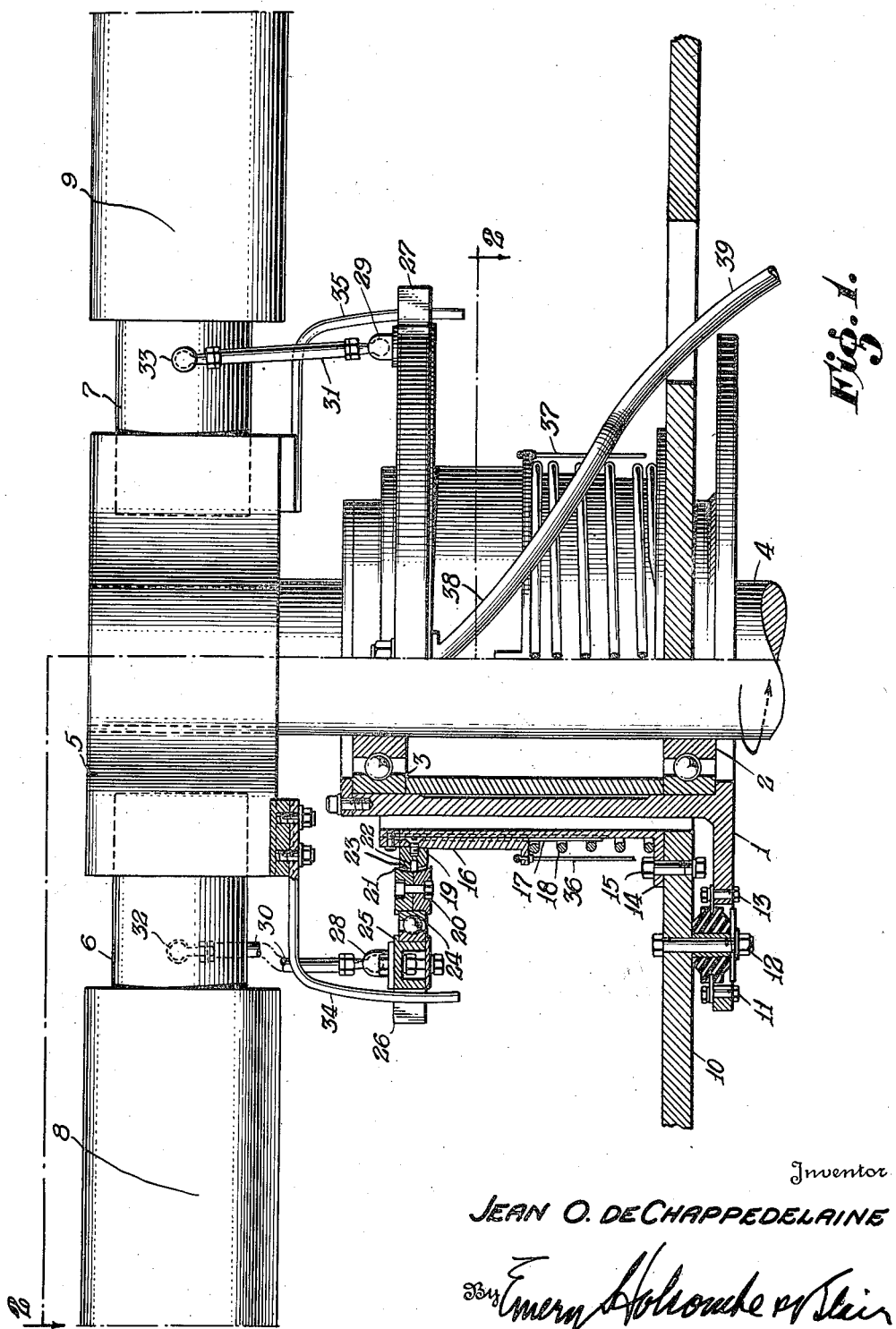
Fig. 1 is a partial section and partial elevational view showing only the rotor hub, arms, and blades, the flexible rotor mounting, the cyclic pitch control, and the reversing pitch device with control stick action, as all the other parts of the helicopter are substantially standard construction and require no detailed explanation.

The mounting and pitch control device is essentially composed of a shaft bearing support 1 holding the annular bearings, 2 and 3 in which rotates a main rotor shaft 4. On this shaft 4 is mounted a rotor hub 5 in which laterally and oppositely external arms 6 and 7 can turn and support oppositely directed lifting blades 8 and 9.

The shaft bearing support 1 is attached on the top of the under side of the main fuselage 10 as shown in Fig. 1 by means of several flexible mountings 11 preferably made of rubber or the like, for instance, and which allow a small angular motion of the rotor shaft with regard to the fuselage. Suitable means, such as bolts 12, attach these mountings 11 to the fuselage and bolts 13 attach the mountings 11 to the shaft bearing support.

On the upper side of the fuselage 10 is also attached a cylindrical control support 14, as by bolts 15 for instance. The control support 14 guides and supports a sliding concentric sleeve 16, adapted to move up and down but not to rotate. The rotation of this sleeve 16 is prevented by means of a key 17 attached to the cylindrical control support 14. The outer sleeve 16 is stopped in its upward movement by a shoulder at the top of the control support 14 and is normally prevented from sliding down by a coiled spring 18. The sleeve 16 supports at its top end an attached ring 19 having a convex peripheral surface. A swiveling disc or ring assembly composed of two parts 20 and 21, secured together as shown is mounted around disc or ring 19 and concentrically to it. The internal surface of these parts 20 and 21 contact with the convex or spherically curved surface of the ring 19 in order to provide the desired motion.

This assembly can swivel but cannot rotate around the stationary disc ring 19 because of the presence of a pin 22 fixed on the disc 19. The pin travels in a groove 23 provided in the swiveling disc assembly.

Concentric to the swiveling disc assembly a circumferential bearing 24 is mounted and is supported in a concentric and external ring 25. The external ring 25 is fitted with V-shaped driving clips 26 and 27. On the external ring 25 are fitted ball joints 28 and 29 attached to connecting rods 30 and 31, fitted at their other or upper ends with ball joints 32 and 33 which are attached respectively to the semi-rotative rotor arms 6 and 7. In fact any desired connection is provided in order to transmit the desired rotative movement to the blades.

To drive the external ring 25, driving bars 34 and 35 the lower ends of which are engaged in the driving clips 26 and 27, and are attached rigidly to the hub 5 or to the shaft 4 as desired. Push-pull control rods or control wires 36 and 37, Fig. 1, are attached to the bottom of the sliding sleeve 16. The other ends of these wires pass through the fuselage and are connected in any desired manner (not shown) with a suitable conventional remote control device in the cockpit thereby to enable the pilot to move the wires and to lock them in any desired position.

A yoke 38 provided at the upper end of the control stick 39 is attached rigidly to the swiveling ring or disc assembly 20 and 21 as shown in Fig. 3 and Fig. 4. The control stick 39, Figs. 4 and 5, is provided at its lower end with a handle 40 of which a section is shown in Fig. 4. The handle 40 is hollow and fitted internally with a spring 41. A handle cover 42 is provided with a locking pin 43 and retains the spring 41. The lower end of the control stick 39 is not fixed rigidly in the handle which can slide up and down therein. For this purpose the end of the control stick is fitted with a spring washer 44 against which the spring 41 pushes.

A curved or convex locking plate 45 provided with suitably arranged holes 46 is located just under and conveniently near the control handle 40, and is supported by a support 47 attached to a fixed part of the fuselage as for instance the floor 48 in the cockpit. The perforated locking plate 45 is curved in order that its surface remains at the same distance from the handle as the pilot moves it and the locking pin 43 can be put easily in the desired hole.

The operation of the devices described above is as follows: In order to prevent constant and excessive pressure on the spring 18 and to ease the maneuvers, the rotor blades are preferably selected with a small center of pressure travel and are mounted so that the line of the aero-dynamic centers of pressure coincide with the arm axis, see Fig. 3. The connecting rods 30 and 31 are designed so that, when the ring 25 is horizontal the blades 8 and 9 have the same pitch. In moving the control wires 36 and 37 the pilot can overcome the resistance of the spring 18 and force the sleeve 16 to slide in the desired direction. In this motion the sleeve 16 carries with it the ring 25 and because of the connecting rods 30 and 31, compels the semi-rotative arms 6 and 7 to turn in the hubs thereby varying the pitch of each blade. The sliding travel of the sleeve 16 is such that the blades may be set, at will, from the maximum positive pitch, used for the take-off, to the negative pitch required for autorotation in case of engine failure. Fig. 3 shows how the center line AB of the semi-rotative arm supporting the blade take the position CD when the plane of the control disc goes down from the position EF to the position GH. The remote control actuating the the control wires 36 and 37 permits these wires to be locked in any intermediary desired position from the maximum pitch to the minimum pitch. To fly the helicopter forward, backward or sideward, or to compensate the asymmetrical action of the air on the retreating and advancing blades when the helicopter flies forward, the pilot has to make cyclical change of pitch. For this purpose the pilot pushes the control stick upwards by means of handle 40 in order to disengage the locking pin 43 from the perforated locking plate 45 and then he is able to move the control stick to any position required by the maneuvers he intends to perform. For instance to fly forward he will pull the control stick backward. This motion forces the swiveling disc assembly which is attached to the control stick yoke, to swivel in such a manner that the pitch of the blades, when running above the aft of the fuselage, will be increased and the pitch of the blades, when running above the front of the fuselage will be decreased. This cyclical difference in pitch will force the whole helicopter to tilt forward and then to fly forward. If the pilot wants to have his hands free he can release his upward pressure on the handle and let the locking pin 43 enter in the hole corresponding to the desired position of the control stick.

The cyclical pitch control device and the whole pitch control device described above secures a complete control of the rotor. In addition, due to the flexibility of the rotor shaft bearing support, the rotor vibrations are absorbed and any unexpected swiveling motion of the rotor with regard to the fuselage is damped automatically. Supposing that an abrupt gust of wind tilts the rotor toward and to the left, the rotor arm 6 will tend to approach the external ring 25 which is locked in a previously determined position. This motion will force the rotor arm to rotate in the hub by reason of the presence of the connecting rod 30 and the pitch of the blade will be increased. For similar reasons the pitch of the opposite blade will be decreased. These pitch variations will create a couple tending to reestablish the rotor blades.

The construction and operation of a preferred embodiment of the invention is clear from the above description by having the amid rotor shaft resiliently mounted with respect to the fuselage; that is, within the concentric support but by being spaced therefrom a relative tilting action is permitted to take place between the fuselage and its fixed sleeve on the one hand and the main shaft with its surrounding concentric support on the other. This relative tilting action may be easily and quickly accomplished by simple operation of the control stick 39 together with the relative up and down movement of the ring disc assembly around the upper part of the support which permits the desired swiveling action without relative rotation.

The invention is of a simple and reliable construction, relatively inexpensive to manufacture and assemble, but well adapted to accomplish, among others, all the objects and advantages herein set forth.

Without further analysis the foregoing will so fully reveal the gist of this invention that others can, by applying current knowledge, readily adapt it for various applications without omitting certain features that, from the standpoint of the prior art, fairly constitute essential characteristics of the generic or specific aspects of the invention, and therefore such adaptations should and are intended to be comprehended within the meaning and range of equivalency of the following claims.

I claim:

1. In a helicopter the combination of a fuselage, and a rotor, rigidly mounted blades journaled on the rotor for pitch change, a support for the rotor including a drive shaft and a shaft support resiliently and tiltably mounted on the fuselage in which the drive shaft is journaled, a pitch control including a support rigid with the fuselage, a stick controlled universally tiltable member on the support, a pitch control connection between the tiltable member and the blades for controlling the blade pitch movements, whereby aerodynamic unbalancing forces acting on the rotor affecting a tilting of the support produce corrective cyclic pitch control movements of the rotor blades.

2. A device as set forth in claim 1 in which the control means includes pitch control means interposed between said ring and the rotor for driving the ring as the hub rotates.

3. A device as set forth in claim 1 in which the control means for actuating the rotor blades includes an outer ring and means interposed between said rings and the rotor having ball connections with each at their respective ends.

4. A device as set forth in claim 1 in which the mounting between the fuselage and support includes a control support attached to the fuselage and having a sliding sleeve surrounding and keyed to the control support.

5. A device as set forth in claim 1 in which the pitch control means includes a ring mounted on the sleeve, a swivel ring assembly mounted concentrically with respect to the first ring and means permitting said rings to swivel with respect to each other.

6. A device as set forth in claim 1 in which the pitch control includes means between the rotor and outer ring to drive the same as the hub rotates and the control stick connected with one of said rings.

JEAN OLIVIER DE CHAPPEDELAINE.